United States Patent Office 2,872,488
Patented Feb. 3, 1959

2,872,488

1-(β-HYDROXYETHYL)- AND 1-(β-HALOETHYL)-2-METHYL - 5 - ISOPROPENYLCYCLOHEXENE - 1 AND PROCESS OF PRODUCTION

John Alexander Hogg and Robert Warren Jackson, Kalamazoo, Mich., assignors to The Upjohn Company, Kalamazoo, Mich., a corporation of Michigan No Drawing. Application May 8, 1952
Serial No. 286,824

9 Claims. (Cl. 260—617)

This invention relates to 1-(β-haloethyl)-2-methyl-5-isopropenylcyclohexenes and to a process for the production thereof.

It is an object of this invention to provide novel 1-(β-haloethyl)-2-methyl-5-isopropenylcyclohexenes. Another object is the provision of a process for the production thereof. Other objects will be apparent to those skilled in the art to which this invention pertains.

The novel compounds of the present invention are prepared by reacting 1-(β-hydroxyethyl)-2-methyl-5-isopropenylcyclohexene-1 with a substitution halogenating agent, usually in the presence of a base such as, for example, pyridine, toluidine, or collidine, to produce a 1-(β-haloethyl)-2-methyl-5 - isopropenylcyclohexene - 1. Halogen and the prefix halo-, wherever mentioned in this specification and the appended claims, indicate chlorine or bromine. The term substitution halogenating agent, wherever mentioned in this specification and appended claims, means an agent which introduces a chlorine or bromine atom into an organic compound by substitution of a hydroxy group and not by addition. Halogenating agents of particular interest are phosphorus trichloride, phosphorus pentachloride, thionyl chloride and phosphorus tribromide, phosphorus pentabromide, and thionyl bromide.

The starting 1-(β-hydroxyethyl)-2-methyl-5-isopropenylcyclohexene-1 is prepared by reacting lithium aluminum hydride with a lower-alkyl 2-methyl-5-isopropenyl-1-cyclohexene-1-acetate which in turn is prepared by reacting a lower-alkyl 1-hydroxy-2-methyl-5-isopropenylcyclohexaneacetate with a dehydrating agent. Treatment of d-dihydrocarvone with a loweralkyl bromoacetate in the presence of zinc is productive of a lower-alkyl 1-hydroxy-2-methyl-5-isopropenylcyclohexaneacetate.

The compounds of the present invention are useful as precursors to compounds with more complex structures. Moreover, the compounds of the present invention are useful compounds per se, possessing physical characteristics which render them useful as plasticizers for plastics such as, for example, nitrocellulose and cellulose acetate. 1-(β-bromoethyl)-2-methyl-5 - isopropenylcyclohexene-1, for example, is a high boiling liquid with a sweet floral odor which, when heated at about 100 degrees centigrade, is productive of a sweet smelling highly viscous semi-fluid plastomer. This polymerization is also noted at room temperature, although to a lesser degree. This polymer, as well as the monomeric form, is useful as a plasticizer.

The following examples are illustrative of the processes and products of the present invention but are not to be construed as limiting.

EXAMPLE 1

*Methyl 1-hydroxy-2-methyl-5-isopropenylcyclohexaneacetate*

This compound was prepared by the Reformatsky reaction (Organic Reactions, vol. 1) using d-dihydrocarvone (2-methyl-5-isopropenylcyclohexanone) boiling at 45 to 51 degrees centigrade at 0.03 millimeter of mercury and having an $[\alpha]_D^{23}$ of plus twenty degrees (chloroform) and a $N_D^{20}$ of 1.4206 as starting material, according to the following procedure.

A mixture of 15.2 grams (0.1 mole) of d-dihydrocarvone having the above-described properties and 15.3 grams (0.1 mole) of methyl bromoacetate was dissolved in 140 milliliters of an equal mixture (by volume) of benzene and toluene and thereafter added, over a period of 25 minutes, to 6.54 grams of shredded, acid-washed and dried zinc activated by a small crystal of iodine. The resulting mixture, which refluxed gently during the addition of the reactants, was stirred for an additional two hours, whereafter 0.11 chemical equivalent of concentrated sulfuric acid in 100 milliliters of water was added thereto. The resulting organic layer was separated and the aqueous layer extracted three times with twenty-milliliter portions of ether which were thereafter combined with the separated organic layer. The combined organic layer and ether extracts were dried over anhydrous magnesium sulfate. The drying agent was filtered and washed with ether and the combined filtrates were distilled at about twenty millimeters of mercury. The residue was distilled through a twelve by 150 millimeter Vigreux column yielding 16.8 grams of methyl 1-hydroxy-2-methyl-5-isopropenylcyclohexaneacetate, boiling at 104 to 106 degrees centigrade at 0.03 millimeter of mercury and having an $[\alpha]_D^{23}$ of minus two degrees (chloroform) and a $N_D^{20}$ of 1.4766.

*Analysis.*—Percent calculated for $C_{13}H_{22}O_3$: C, 68.95; H, 9.75. Found: C, 69.17, 69.16; H, 9.91, 9.46.

In a similar manner, other esters of 1-hydroxy-2-methyl-5-isopropenylcyclohexaneacetic acid are prepared by reacting d-dihydrocarvone with other esters of bromoacetic acid, such as, for example, methyl, ethyl, propyl, isopropyl, butyl, amyl, hexyl, heptyl, octyl, or like esters.

EXAMPLE 2

*Methyl 2-methyl-5-isopropenyl-1-cyclohexene-1-acetic acid*

A stirred solution of 11.3 grams (0.05 mole) of methyl 1-hydroxy-2-methyl-5-isopropenylcyclohexaneacetate in a mixture of thirty milliliters of benzene and twenty milliliters of pyridine was cooled to zero degrees centigrade in an ice-salt bath and 5.44 grams (0.02 mole) of phosphorus tribromide dissolved in thirty milliliters of benzene was then added dropwise thereto over a period of twenty minutes while maintaining the reaction temperature between zero degrees and five degrees centigrade. The reaction mixture was stirred for an additional three hours while maintaining the temperature of the reaction mixture at about zero degrees centigrade. The reaction mixture was then mixed with 100 milliliters of ice water. The pyridine was removed from the organic layer by washing with two 25-milliliter portions of cold two percent hydrochloric acid. The separated aqueous layer was washed with two 25-milliliter portions of ether which were thereafter combined with the organic reaction layer and the whole then dried with anhydrous magnesium sulfate. The solvent was filtered and the drying agent was washed with 25 milliliters of ether. The combined filtrates were distilled at twenty milliliters of mercury pressure and the residue thereafter fractionally distilled through a twelve by 150 millimeter Vigreux column. Methyl 2-methyl-5-isopropenyl-1-cyclohexene-1-acetate boiling at 75 to 80 degrees centigrade at a pressure of 0.05 millimeter of mercury, was collected and found to have an $[\alpha]_D^{23}$ of plus 35 degrees and a $N_D^{20}$ of 1.4847. Infrared absorption spectrum analysis confirmed the theoretical structure.

In a similar manner, by reacting other esters of 1-hydroxy-2-methyl-5-isopropenyl-1-cyclohexene-1-acetic acid such as, for example, methyl, ethyl, propyl, isopropyl, butyl, hexyl, heptyl, octyl esters, or the like, with phosphorus tribromide or other dehydrating agents such as, for example, phosphorus trichloride, phosphorus oxychloride, phosphorus pentoxide, thionyl chloride in pyridine, or the like, other esters of 2-methyl-5-isopropenyl-1-cyclohexene-1-acetic acid are prepared.

EXAMPLE 3

*1-(β-hydroxyethyl)-2-methyl-5-isopropenylcyclohexene-1*

To a solution of 1.52 grams (0.04 mole) of lithium aluminum hydride dissolved in fifty milliliters of sodium-dried ether in a 250-milliliter round bottom flask fitted with a stirrer, condenser topped by a calcium chloride drying tube, and a dropping funnel, was added dropwise a solution of 8.3 grams (0.04 mole) of methyl 2-methyl-5-isopropenyl-1-cyclohexene-1-acetate dissolved in 25 milliliters of dry ether. The reaction mixture refluxed gently during the addition and refluxing was continued one hour by heating on a steam bath. The cooled reaction mixture was thereafter decomposed by the cautious addition of water until refluxing ceased and the whole made acidic by the addition of cold two percent hydrochloric acid. The ether layer was separated and the aqueous layer, after saturating with sodium chloride, was extracted with three fifteen-milliliter portions of ether. The combined ether layer and ether extracts were dried with anhydrous magnesium sulfate, filtered, the drying agent washed with ether and the combined filtrates distilled at water pump pressure. The residue was distilled through a twelve by 150 millimeter Vigreux column to yield 1-(β-hydroxyethyl)-2-methyl-5-isopropenylcyclohexene-1, boiling at 88 to 92 degrees centigrade at a pressure of 0.03 millimeter of mercury and having an $[\alpha]_D^{23}$ of plus 48 degrees (chloroform) and a $N_D^{20}$ of 1.4978. Infrared spectrum analysis confined the structure.

In a similar manner, 1-(β-hydroxyethyl)-2-methyl-5-isopropenylcyclohexene-1 is prepared by reacting other esters, especially lower-alkyl esters, of 2-methyl-5-isopropenyl-1-cyclohexene-1-acetic acid with lithium aluminum hydride.

EXAMPLE 4

*1-(β-bromoethyl)-2-methyl-5-isopropenylcyclohexene-1*

A solution of 4.0 grams (0.022 mole) of 1-(β-hydroxyethyl)-2-methyl-5-isopropenylcyclohexene-1 dissolved in 0.5 milliliter of pyridine and 25 milliliters of Skellysolve B hexane hydrocarbons was cooled in an ice-salt bath to about zero degrees centigrade whereafter 2.2 grams (0.008 mole) of phosphorus tribromide dissolved in ten milliliters of Skellysolve B hexane hydrocarbons was added dropwise over a period of thirty minutes. The temperature of the reaction mixture was maintained at zero degrees centigrade during the addition and the subsequent two hours of stirring. The reaction mixture was thereafter mixed with 100 milliliters of water, the organic layer separated, and the aqueous layer extracted with three ten-milliliter portions of ether. The ether extracts were combined with the separated organic layer and the whole washed with a cold sodium bicarbonate solution and thereafter dried with anhydrous magnesium sulfate. The solvent was removed by distillation at water pump pressure and the residue distilled through a twelve by 150 millimeter Vigreux column to yield 1-(β-bromoethyl)-2-methyl-5-isopropenylcyclohexene-1, boiling at 94 to 95 degrees centigrade at a pressure of 0.05 millimeter of mercury and having an $[\alpha]_D^{23}$ of plus nineteen degrees and a $N_D^{20}$ of 1.5184. Infrared spectrum analysis and bromine analysis confirmed the structure.

EXAMPLE 5

*1-(β-chloroethyl)-2-methyl-5-isopropenylcyclohexene-1*

Following the procedure of Example 4, 1-(β-chloroethyl)-2-methyl-5-isopropenylcyclohexene-1 is prepared by reacting 1-(β-hydroxyethyl)-2-methyl-5-isopropenylcyclohexene-1 with phosphorus trichloride in a mixture of Skellysolve B hexane hydrocarbons and pyridine.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A compound selected from the group consisting of 1-(β-bromoethyl)-2-methyl-5-isopropenylcyclohexene-1 and 1-(β-chloroethyl)-2-methyl-5-isopropenylcyclohexene-1.

2. 1-(β-bromoethyl)-2-methyl-5-isopropenylcyclohexene-1.

3. 1-(β-chloroethyl)-2-methyl-5-isopropenylcyclohexene-1.

4. A process for the production of 1-(β-haloethyl)-2-methyl-5-isopropenylcyclohexene-1 which comprises: reacting d-dihydrocarvone with a lower-alkyl ester of bromoacetic acid in the presence of zinc followed by the decomposition of the organozinc complexes with acid to produce a lower-alkyl 1-hydroxy-2-methyl-5-isopropenylcyclohexaneacetate, reacting the thus-produced lower-alkyl 1-hydroxy-2-methyl-5-isopropenylcyclohexaneacetate with a dehydrating agent to produce a lower-alkyl 2-methyl-5-isopropenyl-1-cyclohexene-1-acetate, reacting the thus-produced lower-alkyl 2-methyl-5-isopropenyl-1-cyclohexene-1-acetate with lithium aluminum hydride to produce 1-(β-hydroxyethyl)-2-methyl-5-isopropenylcyclohexene-1, and thereafter reacting the thus-produced 1-(β-hydroxyethyl)-2-methyl-5-isopropenylcyclohexene-1 with a substitution halogenating agent capable of converting a hydroxy group to a halogen having an atomic weight from 35 to 80, inclusive, to produce 1-(β-haloethyl)-2-methyl-5-isopropenylcyclohexene-1.

5. A process for the production of 1-(β-haloethyl)-2-methyl-5-isopropenylcyclohexene-1 which comprises: reacting a lower-alkyl 1-hydroxy-2-methyl-5-isopropenylcyclohexaneacetate with a dehydrating agent to produce a lower-alkyl 2-methyl-5-isopropenyl-1-cyclohexene-1-acetate, reacting the thus-produced lower-alkyl 2-methyl-5-isopropenyl-1-cyclohexene-1-acetate with lithium aluminum hydride to produce 1-(β-hydroxyethyl)-2-methyl-5-isopropenylcyclohexene-1, and reacting the thus-produced 1-β-hydroxyethyl-2-methyl-5-isopropenylcyclohexane-1 with a substitution halogenating agent capable of converting a hydroxy group to a halogen having an atomic weight from 35 to 80, inclusive, to produce 1-(β-haloethyl)-2-methyl-5-isopropenylcyclohexene-1.

6. A process for the production of 1-(β-haloethyl)-2-methyl-5-isopropenylcyclohexene-1 which comprises: reacting a lower-alkyl 2-methyl-5-isopropenyl-1-cyclohexene-1-acetate with lithium aluminum hydride to produce 1-(β-hydroxyethyl)-2-methyl-5-isopropenylcyclohexene-1, and reacting the thus-produced 1-(β-hydroxyethyl)-2-methyl-5-isopropenylcyclohexene-1 with a substitution halogenating agent capable of converting a hydroxy group to a halogen having an atomic weight from 35 to 80, inclusive, to produce 1-(β-haloethyl)-2-methyl-5-isopropenylcyclohexene-1.

7. A process for the production of 1-(β-haloethyl)-2-methyl-5-isopropenylcyclohexene-1 which comprises: condensing d-dihydrocarvone with a lower-alkyl ester of bromoacetic acid in the presence of zinc followed by the decomposition of the organozinc complexes with acid to produce a lower-alkyl 1-hydroxy-2-methyl-5-isopropenylcyclohexaneacetate, dehydrating the thus-produced lower-alkyl 1-hydroxy-2-methyl-5-isopropenylcyclohexaneacetate with a dehydrating agent to produce a lower-alkyl 2-methyl-5-isopropenyl-1-cyclohexene-1-acetate, reducing the thus-produced lower-alkyl 2-methyl-5-isopropenyl-1-cyclohexene-1-acetate with lithium aluminum hydride to produce 1-($\beta$-hydroxyethyl)-2-methyl-5-isopropenylcyclohexene-1, and thereafter replacing the hydroxy group of the thus-produced 1-($\beta$-hydroxyethyl)-2-methyl-5-isopropenylcyclohexene-1 with a halogen by reaction with a halogenating agent selected from the group consisting of phosphorus tribromide, phosphorus pentabromide, thionyl bromide, phosphorus trichloride, phosphorus pentachloride and thionyl chloride to produce 1-($\beta$-haloethyl)-2-methyl-5-isopropenylcyclohexene-1.

8. 1-($\beta$-hydroxyethyl) - 2 - methyl-5-isopropenylcyclohexene-1.

9. A process for the production of 1-($\beta$-hydroxyethyl)-2-methyl-5-isopropenylcyclohexene-1 which comprises: reacting d-dihydrocarvone with a lower-alkyl ester of bromoacetic acid in the presence of zinc followed by the decomposition of the organozinc complexes with acid to produce a lower-alkyl 1-hydroxy-2-methyl-5-isopropenylcyclohexaneacetate, reacting the thus-produced lower-alkyl 1 - hydroxy-2-methyl-5-isopropenylcyclohexaneacetate with a dehydrating agent to produce a lower-alkyl 2-methyl-5-isopropenyl-1-cyclohexene-1-acetate, and reacting the thus-produced lower-alkyl 2-methyl-5-isopropenyl-1-cyclohexene-1-acetate with lithium aluminum hydride to produce 1-($\beta$-hydroxyethyl)-2-methyl-5-isopropenylcyclohexene-1.

References Cited in the file of this patent

UNITED STATES PATENTS 2,427,345    Bain ------------------ Sept. 16, 1947

OTHER REFERENCES

Beilstein, 6, 102 (1923).
Beilstein, 9, 89 (1926).
Schmidt et al.: "A Textbook of Organic Chemistry," p. 141 (1950).
Organic Reactions, J. Wiley, 1951, Adams, ed., vol. VI, pp. 477–8, 501.